US012626221B1

(12) United States Patent
Somisetty et al.

(10) Patent No.: US 12,626,221 B1
(45) Date of Patent: May 12, 2026

(54) SMART MICRO FULFILLMENT CENTERS POWERED BY MACHINE LEARNING BASED CLUSTERS

(71) Applicant: Blue Yonder Group, Inc., Scottsdale, AZ (US)

(72) Inventors: Harish Kumar Somisetty, Bangalore (IN); Vamshi Krishnam Raju Bollepally, Hyderabad (IN); Sudheer Kumar Gattu, Kondapur (IN)

(73) Assignee: Blue Yonder Group, Inc., Scottsdale, AZ (US)

( * ) Notice: Subject to any disclaimer, the term of this patent is extended or adjusted under 35 U.S.C. 154(b) by 207 days.

(21) Appl. No.: 18/541,899

(22) Filed: Dec. 15, 2023

Related U.S. Application Data

(60) Provisional application No. 63/480,034, filed on Jan. 16, 2023.

(51) Int. Cl.
G06Q 10/087 (2023.01)
G06N 5/022 (2023.01)

(52) U.S. Cl.
CPC ........... G06Q 10/087 (2013.01); G06N 5/022 (2013.01)

(58) Field of Classification Search
CPC .............................. G06Q 10/087; G06N 5/022
See application file for complete search history.

(56) References Cited

U.S. PATENT DOCUMENTS

| | | | |
|---|---|---|---|
| 6,898,472 B2 | 5/2005 | Crampton et al. | |
| 9,487,356 B1 * | 11/2016 | Aggarwal | ............... B65G 1/137 |
| 2003/0126023 A1 * | 7/2003 | Crampton | .......... G06Q 30/0601 |
| | | | 705/22 |
| 2003/0149631 A1 * | 8/2003 | Crampton | ............... G06Q 10/06 |
| | | | 705/22 |

(Continued)

OTHER PUBLICATIONS

CBInsights, "The Next Shipping & Delivery Battleground: Why Amazon, Walmart, & Smaller Retailers Are Betting on Micro-Fulfillment," CBInsights Research Briefs, Jul. 21, 2020. Accessed at https://www.cbinsights.com/research/micro-fulfillment-tech-shipping-retail/ (Year: 2020).

(Continued)

*Primary Examiner* — Garcia Ade
(74) *Attorney, Agent, or Firm* — Spencer Fane LLP; Steven J. Laureanti

(57) ABSTRACT

A system and method are disclosed for determining inventory to stock at a supply chain site. The method includes determining a set of inventory clusters identifying inventory items that have been purchased together, ranking the set of inventory clusters based on a number of times each cluster of inventory items was purchased together, determining an amount of shelf space needed for each of the set of inventory clusters, ranking any inventory clusters that were purchased an equal number of times based on the amount of shelf space needed to generate a cluster ranking, and determining inventory to stock at the supply chain site based on the cluster ranking. The method further includes generating an inventory stocking plan based on the determined inventory to (Continued)

stock, and implementing the inventory stocking plan at the supply chain site based on the inventory stocking plan using one or more pieces of automated stocking machinery.

20 Claims, 4 Drawing Sheets

(56) References Cited

U.S. PATENT DOCUMENTS

| | | | |
|---|---|---|---|
| 2003/0177050 A1* | 9/2003 | Crampton .............. | G06Q 10/06 |
| | | | 700/97 |
| 2018/0315059 A1* | 11/2018 | Venkatesh ............ | G06Q 10/087 |

OTHER PUBLICATIONS

Modula, "E-Commerce Micro-Fulfillment: Space and Flexibility Reimagined," Modula Blog, May 27, 2022. Accessed at https://modula.us/blog/e-commerce-micro-fulfillment-space-and-flexibility-reimagined/ (Year: 2022).

Syverson, Steve, "What You Need to Know about Micro-Fulfillment for E-Commerce," WarehouseAnywhere Resources, Aug. 23, 2021. Accessed at https://www.warehouseanywhere.com/resources/micro-fulfillment-centers-for-ecommerce/ (Year: 2021).

Infor, "To Use Clusters in Distribution Planning," Infor LN 10.4 Help, Jun. 20, 2022. Accessed at https://docs.infor.com/ln/10.4/en-us/Inolh/default.html (Year: 2022).

* cited by examiner

300

310 — DETERMINE CLUSTERS OF
PURCHASED TOGETHER ITEMS

320 — RANK CLUSTERS BASED ON NUMBER
OF TIMES PURCHASED TOGETHER

330 — DETERMINE SHELF SPACE
USED BY EACH CLUSTER

340 — RANK TIED CLUSTERS BASED
ON SHELF SPACE USED

350 — DETERMINE INVENTORY STOCK
BASED ON RANKED CLUSTERS

SMART MICRO FULFILLMENT CENTERS POWERED BY MACHINE LEARNING BASED CLUSTERS

CROSS-REFERENCE TO RELATED APPLICATIONS

The present disclosure is related to that disclosed in the U.S. Provisional Application No. 63/470,034, filed May 31, 2023, entitled "Smart Micro Fulfillment Centers Powered by Machine Learning Based Clusters." U.S. Provisional Application No. 63/470,034 is assigned to the assignee of the present application. The present invention hereby claims priority under 35 U.S.C. § 119 (e) to U.S. Provisional Application No. 63/470,034.

TECHNICAL FIELD

The present disclosure relates generally to data processing and more specifically to processing data for determining inventory to stock at supply chain locations.

BACKGROUND

Many supply chains or other retail organizations utilize micro fulfillment centers (MFCs) as local hubs for inventory set up in accessible locations near populated customer bases. Supply chain operators set up MFCs as alternatives or supplements to traditional warehouses or distribution centers which are larger and typically in remote locations. Because MFCs typically have less available space than traditional warehouses, efficient usage of MFC space by stocking more profitable items that are more likely to be purchased by customers is important to supply chain operators. Existing methods for determining or recommending inventory for MFCs include manpower intensive and error-prone human planning and industry standard algorithms that only recommend individual items rather than item clusters. Market basket analysis can be used to recommend certain item clusters for MFCs, but fail to make second-order recommendations if the first-order ranking basis of number of orders is tied. Because existing MFC inventory planning is time consumer, error prone and limited in the types of inventory recommendations that can be made, existing MFC inventory planning systems are undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Figure 1:
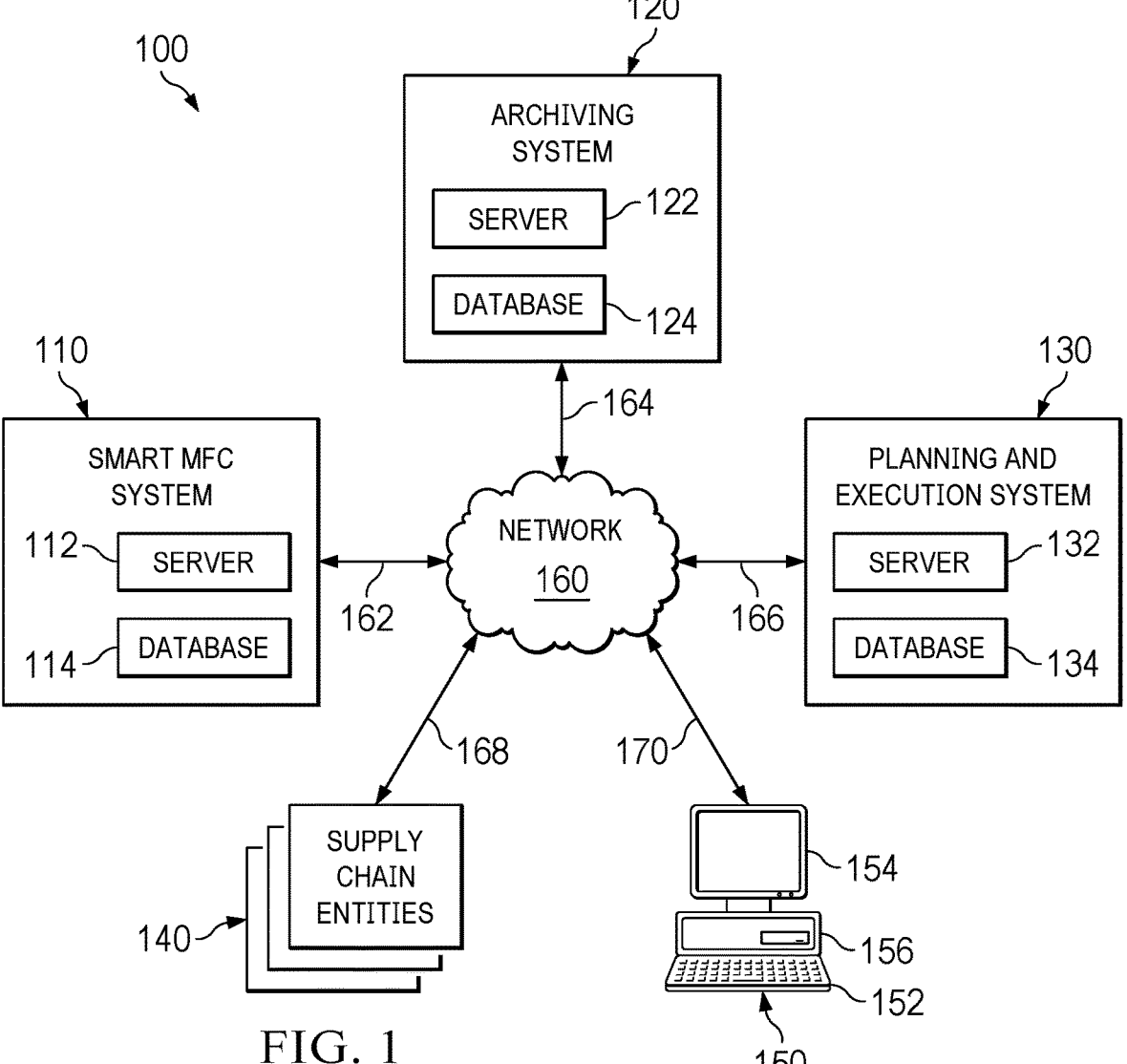
FIG. 1 illustrates a supply chain network, in accordance with an embodiment.

Aspects and applications of the invention presented herein are described below in the drawings and detailed description of the invention. Unless specifically noted, it is intended that the words and phrases in the specification and the claims be given their plain, ordinary and accustomed meaning to those of ordinary skill in the applicable arts.

In the following description and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

Disclosed herein are systems and methods for identifying clusters of products that are most likely to be ordered from a given micro fulfillment center (MFC), within a specified time frame. Embodiments may identify items with a highest degree of affinity with other items, to be present in the same order as a weighted sub-graph, based on machine learning (ML) or artificial intelligence (AI) techniques. Embodiments provide a flexible weighting mechanism that can utilize various item attributes to rank items clusters, such as the number of times an item is part of repeat orders, a catalogue definition of an item, price to profit ratios, transportation constraints, storage constraints and quantities ordered. Embodiments may identify a maximum number of item clusters that can be stored at a given MFC at a given time to be able to fulfill all items for as many orders as possible.

Embodiments provide a completely automated process for identifying and ranking item clusters. Embodiments can guide users to choose clusters of items to stock that are most likely to be part of same order in an effortless manner. The use of embodiments may enable the operator of a supply chain network to fulfill all items for as many orders as possible within supply chain network 100 or at a particular MFC in supply chain network 100. The use of embodiments avoids human errors involved in determining which items to stock in situations with limited shelf space, such as MFCs. The use of embodiments may further eliminate the need for humans experienced in determining what items to stock in limited shelf space scenarios.

Embodiments described below use micro fulfillment centers as example where a smart inventory system can be implemented, however embodiments may be implemented at any supply chain site or supply chain location where inventory is stored or managed, such as a retail store, a distribution center, a warehouse, or any other suitable location within a supply chain. As used herein, a micro fulfillment center or MFC refers to a supply chain location managing inventory at a smaller scale than a traditional warehouse or distribution center, such as a retail store, a grocery store, or other smaller inventory storage location with limited shelf and inventory space.

FIG. 1 illustrates supply chain network 100, in accordance with a first embodiment. Supply chain network 100 comprises smart MFC system 110, archiving system 120, planning and execution system 130, one or more supply chain entities 140, computer 150, network 160 and one or more communication links 162-170. Although a single smart MFC system 110, a single archiving system 120, a single planning and execution system 130, one or more supply chain entities 140, a single computer 150, a single network 160 and one or more communication links 162-170 are shown and described, embodiments contemplate any number of smart MFC systems 110, archiving systems 120, planning and execution systems 130, supply chain entities 140, computers 150, networks 160, or communication links 162-170, according to particular needs.

In one embodiment, smart MFC system 110 comprises server 112 and database 114. Although smart MFC system 110 is illustrated in FIG. 1 as comprising a single server 112 and a single database 114, embodiments contemplate smart MFC system 110 including any suitable number of servers 112 or databases 114, serverless computing options, or data stores, internal to or externally coupled with the semantic search system, according to particular needs. For the purposes of this disclosure, all instances of "server" are understood to include, according to embodiments, one or more embodiments of servers, serverless computing options and/ or other computing solutions and all instances of "database" are understood to include, according to embodiments, databases, datastores, data stores and/or other data storage systems, according to particular needs. As described in further detail below, smart MFC system 110 can determine, for a supply chain site within supply chain network 100, a set of inventory clusters by identifying inventory items that have been purchased together, rank the set of inventory clusters based on a number of times each cluster of inventory items was purchased together, determine an amount of shelf space needed for each of the set of inventory cluster and rank any inventory clusters that were purchased an equal number of times based on the amount of shelf space needed to generate a cluster ranking. As used herein, a supply chain site refers to any supply chain entity or supply chain location where inventory can be stored, transferred, or otherwise used, such as a retailer, a warehouse, a distribution center or any other supply chain entity or supply chain location. In embodiments, smart MFC system 110 may also determine inventory to stock at the supply chain site based on the cluster ranking. In embodiments, the supply chain site may be a micro fulfillment center or any other supply chain site with a limited amount of shelf space available to for stocking products.

Archiving system 120 comprises server 122 and database 124. Although archiving system 120 is shown as comprising a single server 122 and a single database 124, embodiments contemplate any suitable number of servers 122 or databases 124 internal to or externally coupled with archiving system 120. Server 122 may support one or more processes for receiving and storing data from smart MFC system 110, planning and execution system 130 and/or one or more computers 150 of supply chain network 100. According to some embodiments, archiving system 120 comprises an archive of data received from planning and execution system 130 and/or one or more computers 150 of supply chain network 100. Archiving system 120 provides archived data to smart MFC system 110 and/or the planning and execution system 130. Server 122 may store the received data in database 124. Database 124 may comprise one or more databases or other data storage arrangements at one or more locations, local to, or remote from, server 122.

According to an embodiment, planning and execution system 130 comprises server 132 and database 134. Supply chain planning and execution is typically performed by several distinct and dissimilar processes, including, for example, demand forecasting, production planning, supply planning, distribution planning, execution, transportation management, order management, warehouse management, fulfillment, procurement and the like. Server 132 comprises one or more modules, such as, for example, an order capture module, a sourcing module, a scheduling module and/or a pick-pack-ship module for performing one or more order fulfillment processes. Server 132 stores and retrieve data from database 134 or one or more locations in supply chain network 100. In addition, planning and execution system 130 may operate on one or more computers 150 that are integral to or separate from the hardware and/or software that support smart MFC system 110. In embodiments, server 132 may comprise or more modules to predict or forecast demand for one or more supply chain entities 140 based on various data streams, such as historical demand, schedules, upcoming events, weather, customer clusters, demand models or any other data or methods that may be used to predict demand within supply chain network 100. In embodiments, server 132 may comprise one or modules to receive, process and track orders within supply chain network 100, such as orders from customers, transfer orders between supply chain entities 140 or any other order that may be placed within supply chain network 100. In embodiments, server 132 may comprise one or more modules to monitor the status of warehouses, distribution centers or any other supply chain entity 140 that stores inventory within supply chain network 100. In embodiments, server 132 may store data related to the resources and layout of a warehouse or distribution center, as well as current and historical data related to orders, tasks, processes, resources, machinery or any other data related to an inventory storing supply chain entity.

One or more supply chain entities 140 may represent one or more suppliers, manufacturers, distribution centers and retailers in one or more supply chain networks, including one or more enterprises. One or more suppliers may be any suitable entity that offers to sell or otherwise provides one or more items or components to one or more manufacturers or buyers. One or more suppliers may, for example, receive an item from a first supply chain entity in supply chain network 100 and provide the item to another supply chain entity, which in some embodiments may be a buyer, a customer or an end user. Items may comprise, for example, components, materials, products, parts, supplies, or other items, that may be used to produce products. In addition, or as an alternative, an item may comprise a supply or resource that is used to manufacture the item but does not become a part of the item. In embodiments, items may comprise a service, such as an installation service. One or more suppliers may comprise automated distribution systems that automatically transport items to one or more manufacturers based, at least in part, on a supply chain plan having fair-shared items or resources, a material or capacity reallocation, current and projected inventory levels and/or one or more additional factors described herein.

A manufacturer may be any suitable entity that manufactures at least one product. A manufacturer may use one or more items during the manufacturing process to produce any manufactured, fabricated, assembled, or otherwise processed item, material, component, good or product. In one embodiment, a product represents an item ready to be supplied to, for example, another supply chain entity, such as a supplier, an item that needs further processing, or any other item. A manufacturer may, for example, produce and sell a product to a supplier, another manufacturer, a distribution center, a retailer, a customer, or any other suitable person or an entity. Such manufacturers may comprise automated robotic production machinery that produce products based, at least in part, on a supply chain plan having fair-shared items or resources, a material or capacity reallocation, current and projected inventory levels and/or one or more additional factors described herein.

One or more distribution centers may be any suitable entity that offers to sell or otherwise distributes at least one product to one or more retailers and/or customers. Distribution centers may, for example, receive a product from a first supply chain entity in supply chain network 100 and store and transport the product for a second supply chain entity. Such distribution centers may comprise automated warehousing systems that automatically transport products to one or more retailers or customers and/or automatically remove an item from, or place an item into, inventory based, at least in part, on a supply chain plan having fair-shared items or resources, a material or capacity reallocation, current and projected inventory levels and/or one or more additional factors described herein.

One or more retailers may be any suitable entity that obtains one or more products to sell to one or more customers. In addition, one or more retailers may sell, store and supply one or more components and/or repair a product with one or more components. One or more retailers may comprise any online or brick and mortar location, including locations with shelving systems. Shelving systems may comprise, for example, various racks, fixtures, brackets, notches, grooves, slots, or other attachment devices for fixing shelves in various configurations. These configurations may comprise shelving with adjustable lengths, heights and other arrangements, which may be adjusted by an employee of one or more retailers based on computer-generated instructions or automatically by machinery to place products in a desired location.

One or more retailers may also be a shopping mall. As used herein, the term "shopping mall" may refer to a physical building containing one or more retail stores, but may also refer to other collections of related or physically co-located retailers or storefronts, such as stores located in a city center, stores located on a particular street, stores in a particular downtown area or other city subsection, or any other collection of individual retailers acting together to provide a consolidated delivery service or consolidated promotion service as described herein.

The same supply chain entity 130 may simultaneously act as any one or more suppliers, manufacturers, distribution centers, retailers and customers. For example, one or more supply chain entities 130 acting as a manufacturer could produce a product and the same supply chain entity 130 could act as a supplier to supply a product to another supply chain entity. Although one example of supply chain network 100 is shown and described, embodiments contemplate any configuration of supply chain network 100, without departing from the scope of the present disclosure.

As shown in FIG. 1, supply chain network 100 comprising smart MFC system 110, archiving system 120 and planning and execution system 130 may operate on one or more computers that are integral to or separate from the hardware and/or software that support smart MFC system 110, archiving system 120 and the planning and execution system. One or more computers 150 may include any suitable input device, such as a keypad, mouse, touch screen, microphone, or other device to input information. An output device may convey information associated with the operation of supply chain network 100, including digital or analog data, visual information, or audio information. One or more computers 150 may include fixed or removable computer-readable storage media, including a non-transitory computer-readable medium, magnetic computer disks, flash drives, CD-ROM, in-memory device, or other suitable media to receive output from and provide input to supply chain network 100.

One or more computers 150 may include one or more processors and associated memory to execute instructions and manipulate information according to the operation of supply chain network 100 and any of the methods described herein. In addition, or as an alternative, embodiments contemplate executing the instructions on one or more computers 150 that cause one or more computers 150 to perform functions of the method. An apparatus implementing special purpose logic circuitry, for example, one or more field-programmable gate arrays (FPGA) or application-specific integrated circuits (ASIC), may perform functions of the methods described herein. Further examples may also include articles of manufacture including tangible non-transitory computer-readable media that have computer-readable instructions encoded thereon and the instructions may comprise instructions to perform functions of the methods described herein.

In addition, or as an alternative, supply chain network 100 may comprise a cloud-based computing system having processing and storage devices at one or more locations, local to, or remote from smart MFC system 110, archiving system 120 and the planning and execution system. In addition, each of the one or more computers 150 may be a workstation, personal computer (PC), network computer, notebook computer, tablet, personal digital assistant (PDA), cell phone, telephone, smartphone, wireless data port, augmented or virtual reality headset, or any other suitable computing device. In an embodiment, one or more users may be associated with smart MFC system 110 and archiving system 120.

In one embodiment, smart MFC system 110, archiving system 120, planning and execution system 130 and computer 150 may be coupled with network 160 using one or more communication links 162-170, which may be any wireline, wireless, or other link suitable to support data communications between smart MFC system 110, archiving system 120, planning and execution system 130 and computer 150 and network 160 during operation of supply chain network 100. Although communication links 162-170 are shown as generally coupling smart MFC system 110, archiving system 120, planning and execution system 130 and computer 150 to network 160, any of smart MFC system 110, archiving system, planning and execution system 130 and computer 150 may communicate directly with each other, according to particular needs.

In another embodiment, network 160 includes the Internet and any appropriate local area networks (LANs), metropolitan area networks (MANs), or wide area networks (WANs) coupling smart MFC system 110, archiving system 120, planning and execution system 130 and computer 150. For example, data may be maintained locally too, or externally of, smart MFC system 110, archiving system 120, planning and execution system 130 and computer 150 and made available to one or more associated users of MFC system 110, archiving system 120, planning and execution system 130 and computer 150 using network 160 or in any other appropriate manner. For example, data may be maintained in a cloud database at one or more locations external to MFC system 110, archiving system 120, planning and execution system 130 and computer 150 and made available to one or more associated users of MFC system 110, archiving system 120, planning and execution system 130 and computer 150 using the cloud or in any other appropriate manner. Those skilled in the art will recognize that the complete structure and operation of network 160 and other components within supply chain network 100 are not depicted or described. Embodiments may be employed in conjunction with known communications networks and other components.

Figure 2:
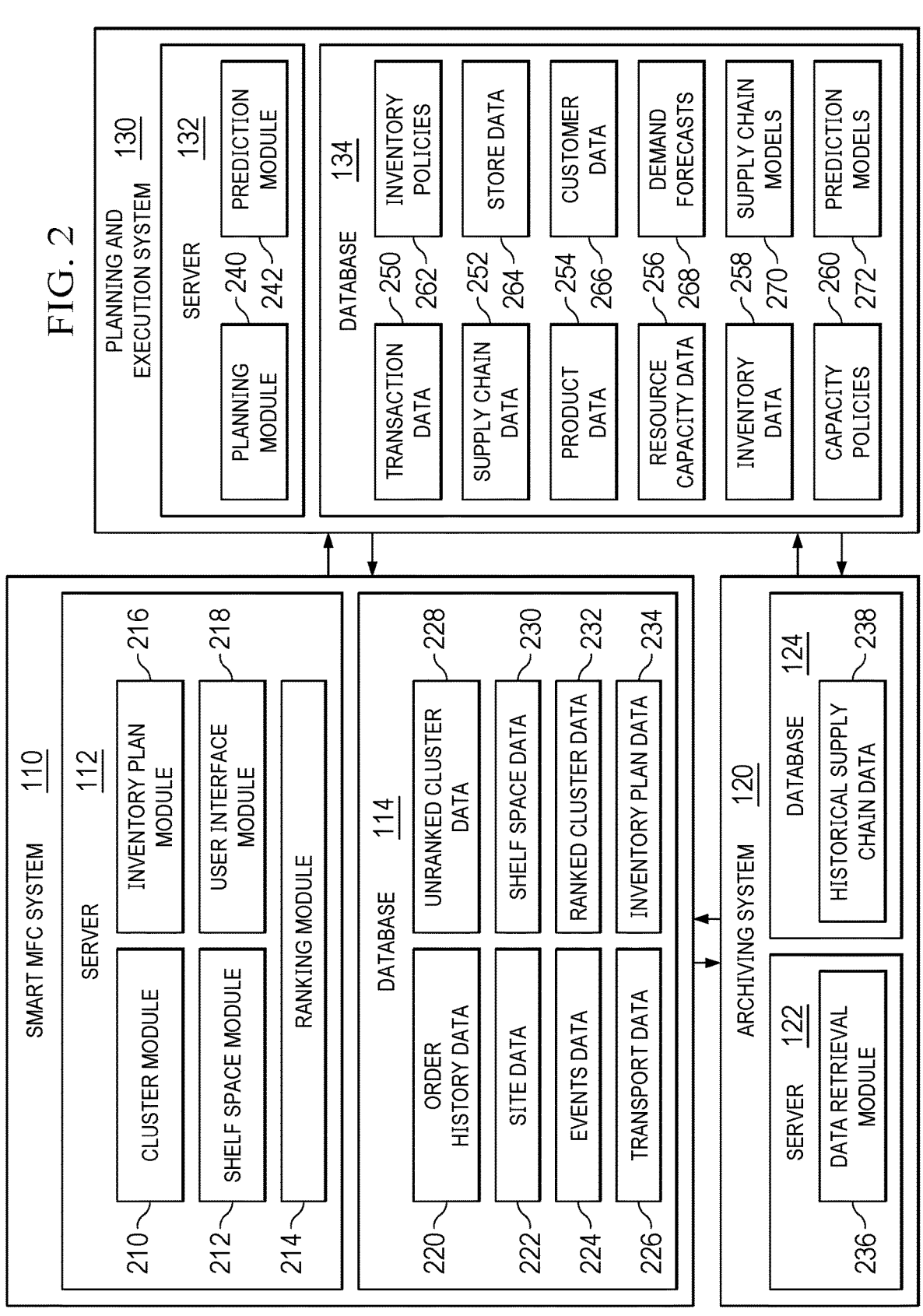
FIG. 2 illustrates smart MFC system 110, archiving system 120 and the planning and execution system of FIG. 1 in greater detail, in accordance with an embodiment.

FIG. 2 illustrates smart MFC system 110, archiving system 120 and planning and execution system 130 of FIG. 1 in greater detail, in accordance with an embodiment. Smart MFC system 110 may comprise server 112 and database 114, as described above. Although smart MFC system 110 is shown as comprising a single server 112 and a single database 114, embodiments contemplate any suitable number of servers 112 or databases 114 internal to or externally coupled with smart MFC system 110.

Server 112 comprises cluster module 210, shelf space module 212, ranking module 214, inventory plan module 216 and user interface module 218. Although server 112 is shown and described as comprising a single cluster module 210, a single shelf space module 212, a single ranking module 214, a single inventory plan module 216 and a single user interface module 218, embodiments contemplate any suitable number or combination of these located at one or more locations, local to, or remote from smart MFC system 110, such as on multiple servers or computers at one or more locations in supply chain network 100.

Database 114 may comprise one or more databases or other data storage arrangements at one or more locations, local to, or remote from, server 112. Database 114 of smart MFC system 110 comprises, for example, order history data 220, site data 222, events data 224, transport data 226, unranked cluster data 228, shelf space data 230, ranked cluster data 232 and inventory plan data 234. Although database 114 is shown and described as comprising order history data 220, site data 222, events data 224, transport data 226, unranked cluster data 228, shelf space data 230, ranked cluster data 232 and inventory plan data 234, embodiments contemplate any suitable number or combination of data, located at one or more locations, local to, or remote from, smart MFC system 110, according to particular needs.

In an embodiment, cluster module 210 identifies clusters of items that were ordered together, along with a number of times that those items were ordered together. In embodiments, cluster module 210 may utilize one or more machine learning (ML) or artificial intelligence (AI) techniques to identify the clusters of items. In embodiments, cluster module 210 may utilize order history data 220 of database 114 to identify the clusters. Cluster module 210 may identify clusters of items based on order history data limited to specified time periods, such as by days, or periods of days. For example, cluster module 210 may use only the purchase history for Friday evenings, or any other possible combination of time of day or week. In embodiments, cluster module 210 may use order history data limited to larger periods, such as monthly, seasonally, or yearly order history data. Cluster module 210 may store the identified clusters in unranked cluster data 228 of database 114.

In an embodiment, shelf space module 212 computes the shelf space needed for each cluster of items identified by cluster module 210. In embodiments, shelf space module 212 may utilize site data 222 of database 114 to access catalog definitions for the items of a particular cluster and use any size, volume or other attributes of the items to determine an amount of shelf space needed for each item as well as an amount of shelf space needed for the cluster as a whole. Shelf space module 212 may store the determined shelf spaces for the items and clusters as shelf space data 230 of database 114.

In an embodiment, ranking module 214 ranks the unranked clusters identified by cluster module 210, according to various criteria. In an embodiment, ranking module 214 may first rank the clusters of items based on the number of times each cluster was purchased. In such embodiments, ranking module 214 may further rank any tied clusters, meaning clusters that were purchased an equal number of times, by other criteria, such as shelf space needed to stock each cluster. For example, ranking module 214 may use shelf space data 230 of database 114, as determined by shelf space module 212, to rank tied clusters. In other embodiments, ranking module 214 may use other ranking criteria to rank clusters, such as such as a "trend" score associated with items of the clusters based on current trends associated with the items or target customers of the items, an "event" scored associated with items of the clusters based on a demand-influencing event related to the items or any other attributes of the items. Ranking module 214 may store the ranked clusters as ranked cluster data 232 of database 114. In embodiments, ranking module 214 may analyze publicly available message or social media data of customers or potential customers in natural language using one or more natural language machine learning (NLP) models in order to define cluster rankings. In embodiments, NLP models such as support vector machines (SVMs), term frequency (TF) models, term frequency inverse document frequency (TF-IDF) models, bag-of-words models, logistic regression models, Naïve Bayes models, decision trees, hidden Markov models, convolutional neural networks, recurrent neural networks, auto-encoder models or NLP transformers, although other NLP techniques may be used according to needs.

In an embodiment, inventory plan module 216 determines inventory to stock at the supply chain site based on the ranked clusters stored in ranked cluster data 232 of database 114. In embodiments, inventory plan module 216 may generate an inventory plan comprising the inventory to be stocked at the supply chain site. For example, inventory plan module 216 may generate an inventory plan comprising items within the top ranked clusters, such as all items from the top ten ranked clusters, all items from the top 10% of ranked clusters, or any other absolute or percentage threshold of the top ranked clusters. In embodiments, inventory plan module 216 may prioritize or deprioritize certain items for the inventory plan based on transportation constraints of the items, storage constraints of the supply chain site, price constraints of the items, or any other constraints of the items or the supply chain site. Inventory plan module 216 may store the inventory plan as inventory plan data 234 of database 114.

In an embodiment, user interface module 218 generates and displays a user interface (UI), such as, for example, a graphical user interface (GUI) on an output device of smart MFC system 110 or another device within or coupled to supply chain network 100, that displays shelf space data, order history data, recommendation data or any other data of smart MFC system 110 in charts or graphs, or any other visual representations of data of smart MFC system 110. According to embodiments, the user interface module displays a GUI comprising interactive graphical elements for selecting one or more proactive inventory plan recommendations and/or data of any kind stored in database 114, and, in response to the selection, displaying the selected data on one or more display devices. For example, the GUIs may be used to present one or more inventory plans to a supply chain planner or store manager, in the example of a MFC, as well as providing the user with the ability to accept or decline inventory plan implementation.

In an embodiment, order history data 220 comprises historical data related to item purchases at the supply chain site or within supply chain network 100, including what items have been purchased together as part of a single order, the quantity of items ordered, repeatedly placed or automatically repeating orders, or any other data related to orders placed at the supply chain site. In embodiments, order history data 220 may be used by cluster module 210 to identify one or more clusters of items based on the sales of the items or sales patterns of the items.

In an embodiment, site data 222 comprises data related to the supply chain site, which may be a MFC, a retailer, or any other inventory storage site within supply chain network 100. As discussed in further detail below, site data 222 may include active promotions for the supply chain site and a product catalog associated with the supply chain site defining items available at the supply chain site and attributes of the items such sizes, volumes weights or other attributes of items, a schedule of the supply chain site, or any other data related to the supply chain site. Site data 222 may also comprise storage location details such as available shelf space or other inventory storage attributes, as well as constraints of the storage location, such as available refrigeration space or other constraints on inventory storage.

In an embodiment, events data 224 comprises data ambient to the supply chain site which may affect the likelihood of customers visiting the supply chain site. For example, the current events data may include weather data or weather forecast data for a locality or region of the supply chain site, or local events data indicating, for example, holidays, festivals, activities, sporting events or any other local events that may impact the likelihood of customers visiting the supply chain site. In embodiments, events data 224 may be used by ranking module 214 to rank one or more clusters of items. In embodiments, events data 224 may be used by inventory plan module 216 to generate an inventory plan for the supply chain site.

In an embodiment, transport data 226 comprises data related to the transportation of items within supply chain network 100, including transportation schedules, costs associated with transporting one or more items, data relating to one or more transportation vehicles, weather data impacting transportation schedules, or any other data relating to transportation of items or transportation constraints. In embodiments, transport data 226 may be used by ranking module 214 to rank one or more clusters of items. In embodiments, transport data 226 may be used by inventory plan module 216 to generate an inventory plan for the supply chain site.

In an embodiment, unranked cluster data 228 comprises a set of clusters of items within supply chain network 100. In embodiments, the clusters of items may comprise combinations of items that have previously been purchased together. For example, in a grocery store MFC, one cluster of items may consist of bread, milk and eggs, while a second cluster may consist of water and chips, or any other combination of products that have been purchased together. Items are not limited to being in a single cluster. For example, one cluster at a grocery store MFC may consist of eggs and milk, while another cluster may consist of eggs and water. Clusters can consist of any amount of items so long as those items have been purchased together, though in practice smaller clusters may be used as smaller clusters will appear more frequently in order history data 220. In embodiments, unranked cluster data 228 may be generated by cluster module 210 and used to rank the clusters by ranking module 214.

In an embodiment, shelf space data 230 comprises computed shelf space data of each of the clusters of unranked cluster data 228. As discussed in further detail above, shelf space module 212 may use site data 222 or other catalogue and item data to generate shelf space data 230. In embodiments, shelf space data 230 may be by ranking module 214 to rank clusters of the unranked clusters data.

In an embodiment, ranked cluster data 232 comprises the set of clusters of items of unranked cluster data 228 ranked according to one or more criteria. In embodiments, the clusters may be ranked first by frequency of purchase, that is, the number of times the cluster of items were purchased together. Thereafter, ties in the clusters may be broken according to any of a number of metrics, including shelf space used by the clusters, with ranking module 214 preferring clusters that use less shelf space. In embodiments, ranked cluster data 232 may be generated by ranking module 214 and used to generate an inventory plan by inventory plan module 216.

In an embodiment, inventory plan data 234 comprises an inventory plan for the supply chain site generated by inventory plan module 216. As discussed in further detail above, inventory plan module 216 may use ranked cluster data 232 to determine what inventory should be stocked at the supply chain site for a particular time period and generate an inventory plan consisting of delivery, stocking and any other actions that would be required to stock the inventory at the supply chain site. In embodiments, the planning and execution system may automatically implement the inventory plan using one or more pieces of automated machinery as described in further detail above.

As discussed above, archiving system 120 comprises server 122 and database 124. Although archiving system 120 is shown as comprising a single server and a single database, embodiments contemplate any suitable number of servers or databases internal to or externally coupled with archiving system 120.

Server 122 comprises data retrieval module 236. Although server 122 is shown and described as comprising a single data retrieval module 236, embodiments contemplate any suitable number or combination of data retrieval modules 236 located at one or more locations, local to, or remote from archiving system 120, such as on multiple servers or computers at one or more locations in supply chain network 100.

Database 124 may comprise one or more databases or other data storage arrangements at one or more locations, local to, or remote from, server 122. Database 124 comprises, for example, historical supply chain data 238. Although database 124 is shown and described as comprising historical supply chain data 238, embodiments contemplate any suitable number or combination of data, located at one or more locations, local to, or remote from, archiving system 120, according to particular needs.

In one embodiment, data retrieval module 236 of archiving system 120 receives historical supply chain data 238 from planning and execution system 130 and one or more supply chain entities 140 and stores the received historical supply chain data 238 in database 124. According to one embodiment, data retrieval module 236 may prepare historical supply chain data 238 for use as training data for one or more artificial intelligence or machine learning models or algorithms of smart MFC system 110 by checking historical supply chain data 238 for errors and transforming historical supply chain data 238 data to normalize, aggregate and/or rescale historical supply chain data 238 to allow direct comparison of data received from different planning and execution systems 130, one or more supply chain entities 140 and/or one or more other locations local to, or remote from, archiving system 120. According to embodiments, data retrieval module 238 may receive data from one or more sources external to supply chain network 100, such as, for example, weather data, special events data, social media data, calendar data and the like and stores the received data as the historical supply chain data.

Historical supply chain data 238 comprises historical data received from smart MFC system 110, archiving system 120, planning and execution system 130, one or more supply chain entities 140 and/or computer 150. Historical supply chain data 238 may comprise, for example, weather data, special events data, social media data, calendar data and the like. In an embodiment, historical supply chain data 238 may comprise, for example, historic sales patterns, prices, promotions, weather conditions and other factors influencing future demand of the number of one or more items sold in one or more stores over a time period, such as, for example, one or more days, weeks, months, years, including, for example, a day of the week, a day of the month, a day of the year, week of the month, week of the year, month of the year, special events, paydays and the like.

As discussed above, planning and execution system 130 comprises server 132 and database 134. Although planning and execution system 130 is shown as comprising a single server 132 and a single database 134, embodiments contemplate any suitable number of servers 132 or databases 134 internal to or externally coupled with planning and execution system 130.

In embodiments, server 132 of planning and execution system 130 comprises planning module 240 and prediction module 242. Although server 132 is shown and described as comprising a single planning module 240 and a single prediction module 242, embodiments contemplate any suitable number or combination of planning modules 240 and prediction modules 242 located at one or more locations, local to, or remote from planning and execution system 130, such as on multiple servers or computers at one or more locations in supply chain network 100. In embodiments, prediction module 242 may use various data sources, such as historic demand data, open orders at a node, local events near the node and other publicly available information, to predict demand at the node. Prediction module 242 may further use inventory availability information, such as that stored in inventory data 258 and resource availability information, such as that stored in the resource capacity information, to predict what demand cannot be fulfilled at the node based on current resource capacity usage.

Database 134 may comprise one or more databases or other data storage arrangements at one or more locations, local to, or remote from, server 132. Database 134 comprises, for example, transaction data 250 such as order and shipment data, supply chain data 252, product data 254, resource capacity data 256, inventory data 258, capacity policies 260, inventory policies 262, store data 264, customer data 266, demand forecasts 268, supply chain models 270 and prediction models 272. Although database 134 is shown and described as comprising transaction data 250, supply chain data 252, product data 254, resource capacity data 256, inventory data 258, capacity policies 260, inventory policies 262, store data 264, customer data 266, demand forecasts 268, supply chain models 270 and prediction models 270, embodiments contemplate any suitable number or combination of data, located at one or more locations, local to, or remote from, supply chain planning and execution system, according to particular needs.

Planning module 240 works in connection with prediction module 242 to generate a plan based on one or more predicted retail volumes, classifications, or other predictions. By way of example and not of limitation, planning module 240 may comprise a demand planner that generates a demand forecast for one or more supply chain entities 130. Planning module 240 may generate the demand forecast, at least in part, from predictions and calculated factor values for one or more causal factors received from prediction module 242. By way of a further example, planning module 240 may comprise an assortment planner and/or a segmentation planner that generates product assortments that match causal effects calculated for one or more customers or products by prediction module 242, which may provide for increased customer satisfaction and sales, as well as reducing costs for shipping and stocking products at stores where they are unlikely to sell.

Prediction module 242 applies samples of transaction data 250, supply chain data 252, product data 254, inventory data 258, store data 264, customer data 266, demand forecasts 268 and other data to prediction models 270 to generate predictions and calculated factor values for one or more causal factors. As discussed above, prediction module 242 predicts a volume Y (target) from a set of causal factors X along with causal factors strengths that describe the strength of each causal factor variable contributing to the predicted volume. According to some embodiments, prediction module 242 generates predictions at daily intervals. However, embodiments contemplate longer and shorter prediction intervals at which predictions may performed, such as for example, weekly, twice a week, twice a day, hourly, or the like.

Transaction data 250 may comprise recorded sales and returns transactions and related data, including, for example, a transaction identification, time and date stamp, channel identification (such as stores or online touchpoints), product identification, actual cost, selling price, sales volume, customer identification, promotions and or the like. In addition, transaction data 250 is represented by any suitable combination of values and dimensions, aggregated or un-aggregated, such as, for example, sales per week, sales per week per location, sales per day, sales per day per season, or the like.

Supply chain data 252 may comprise any data of one or more supply chain entities 130 including, for example, item data, identifiers, metadata (comprising dimensions, hierarchies, levels, members, attributes, cluster information and member attribute values), fact data (comprising measure values for combinations of members), business constraints, goals and objectives of one or more supply chain entities 130.

Product data 254 may comprise products identified by, for example, a product identifier (such as a Stock Keeping Unit (SKU), Universal Product Code (UPC) or the like) and one or more attributes and attribute types associated with the product ID. Product data 254 may comprise data about one or more products organized and sortable by, for example, product attributes, attribute values, product identification, sales volume, demand forecast, or any stored category or dimension. Attributes of one or more products may be, for example, any categorical characteristic or quality of a product and an attribute value may be a specific value or identity for the one or more products according to the categorical characteristic or quality, including, for example, physical parameters (such as, for example, size, weight, dimensions, color and the like).

Resource capacity data 256 may comprise any data relating to current or projected resource capacity values or states, order rules, or the like. For example, resource capacity data 256 may comprise the current level of capacity for each task at one or more locations across supply chain network 100. In addition, resource capacity data 256 may comprise order rules that describe one or more rules or limits on setting a capacity policy, including, but not limited to, a minimum order capacity, a maximum order capacity, a discount, a step-size order capacity and batch quantity rules. According to some embodiments, planning and execution system 130 accesses and stores resource capacity data 256, which may be used by planning and execution system 130 to place orders, set capacity levels at one or more locations in supply chain network 100, initiate manufacturing of one or more components, or the like in response to and based at least in part on, a demand of smart MFC system 110. In embodiments, resource capacity can be defined differently for different task categories and can be defined at each node or for a set of nodes. According to needs, resources, whether human or machines, may be defined to be shared or not shared across different task categories.

Inventory data 258 may comprise any data relating to current or projected inventory quantities or states, order rules, or the like. For example, inventory data 258 may comprise the current level of inventory for each item at one or more stocking points across supply chain network 100. In addition, inventory data 258 may comprise order rules that describe one or more rules or limits on setting an inventory policy, including, but not limited to, a minimum order volume, a maximum order volume, a discount and a step-size order volume and batch quantity rules. According to some embodiments, planning and execution system 130 accesses and stores inventory data 258 in database 124, which may be used by planning and execution system 130 to place orders, set inventory levels at one or more stocking points, initiate manufacturing of one or more components, or the like in response to and based at least in part on, a forecasted demand of smart MFC system 110.

Capacity policies 260 may comprise any suitable capacity policy describing the reorder point and target quantity, or other capacity policy parameters that set rules for smart MFC system 110 and/or planning and execution system 130 to manage capacity. Capacity policies 260 may be based on target service level, demand, cost, or the like. According to embodiments, capacity policies 260 comprise target service levels that ensure that a service level of one or more supply chain entities 130 is met with a set probability. For example, one or more supply chain entities 130 may set a service level at 95%, meaning supply chain entities will set the desired capacity level at a level that meets demand 95% of the time.

Inventory policies 262 may comprise any suitable inventory policy describing the reorder point and target quantity, or other inventory policy parameters that set rules for smart MFC system 110 and/or planning and execution system 130 to manage and reorder inventory. Inventory policies 262 may be based on target service level, demand, cost, fill rate, or the like. According to embodiments, inventory policies 262 comprise target service levels that ensure that a service level of one or more supply chain entities 130 is met with a set probability. For example, one or more supply chain entities 130 may set a service level at 95%, meaning supply chain entities will set the desired inventory stock level at a level that meets demand 95% of the time. Although a particular service level target and percentage is described, embodiments contemplate any service target or level, such as, for example, a service level of approximately 99% through 90%, a 75% service level, or any suitable service level, according to particular needs. Other types of service levels associated with inventory quantity or order quantity may comprise, but are not limited to, a maximum expected backlog and a fulfillment level. Once the service level is set, smart MFC system 110 and/or planning and execution system 130 may determine a replenishment order according to one or more replenishment rules, which, among other things, indicates to one or more supply chain entities 130 to determine or receive inventory to replace the depleted inventory. By way of example only and not by way of limitation, an inventory policy for non-perishable goods with linear holding and shorting costs comprises a min./max. (s,S) inventory policy. Other inventory policies may be used for perishable goods, such as fruit, vegetables, dairy, fresh meat, as well as electronics, fashion and similar items for which demand drops significantly after a next generation of electronic devices or a new season of fashion is released.

Store data 264 may comprise data describing the stores of one or more retailers and related store information. Store data 264 may comprise, for example, a store ID, store description, store location details, store location climate, store type, store opening date, lifestyle, store area (expressed in, for example, square feet, square meters, or other suitable measurement), latitude, longitude and other similar data.

Customer data 266 may comprise customer identity information, including, for example, customer relationship management data, loyalty programs and mappings between product purchases and one or more customers so that a customer associated with a transaction may be identified. Customer data 266 may comprise data relating customer purchases to one or more products, geographical regions, store locations, or other types of dimensions. In embodiments, customer data may also comprise customer profile information including demographic information and preferences.

Demand forecasts 268 may indicate future expected demand based on, for example, any data relating to past sales, past demand, purchase data, promotions, events, or the like of one or more supply chain entities 130. Demand forecasts 268 may cover a time interval such as, for example, by the minute, hour, daily, weekly, monthly, quarterly, yearly, or any other suitable time interval, including substantially in real time. Demand may be modeled as a negative binomial or Poisson-Gamma distribution. According to other embodiments, the model also takes into account shelf-life of perishable goods (which may range from days (e.g. fresh fish or meat) to weeks (e.g. butter) or even months, before any unsold items have to be written off as waste) as well as influences from promotions, price changes, rebates, coupons and even cannibalization effects within an assortment range. In addition, customer behavior is not uniform but varies throughout the week and is influenced by seasonal effects and the local weather, as well as many other contributing factors. Accordingly, even when demand generally follows a Poisson-Gamma model, the exact values of the parameters of the model may be specific to a single product to be sold on a specific day in a specific location or sales channel and may depend on a wide range of frequently changing influencing causal factors. As an example only and not by way of limitation, an exemplary supermarket may stock twenty thousand items at one thousand locations. If each location of this exemplary supermarket is open every day of the year, planning and execution system 130 comprising a demand planner would need to calculate approximately 2×10 ^10 demand forecasts each day to derive the optimal order volume for the next delivery cycle (e.g. three days).

Supply chain models 270 comprise characteristics of a supply chain setup to deliver the customer expectations of a particular customer business model. These characteristics may comprise differentiating factors, such as, for example, MTO (Make-to-Order), ETO (Engineer-to-Order) or MTS (Make-to-Stock). However, supply chain models 270 may also comprise characteristics that specify the supply chain structure in even more detail, including, for example, specifying the type of collaboration with the customer (e.g. Vendor-Managed Inventory (VMI)), from where products may be sourced and how products may be allocated, shipped, or paid for, by particular customers. Each of these characteristics may lead to a different supply chain model. Prediction models 270 comprise one or more of the trained models used by planning and execution system 130 for predicting, among other variables, pricing, targeting, or retail volume, such as, for example, a forecasted demand volume for one or more products at one or more stores of one or more retailers based on the prices of the one or more products.

Figure 3:
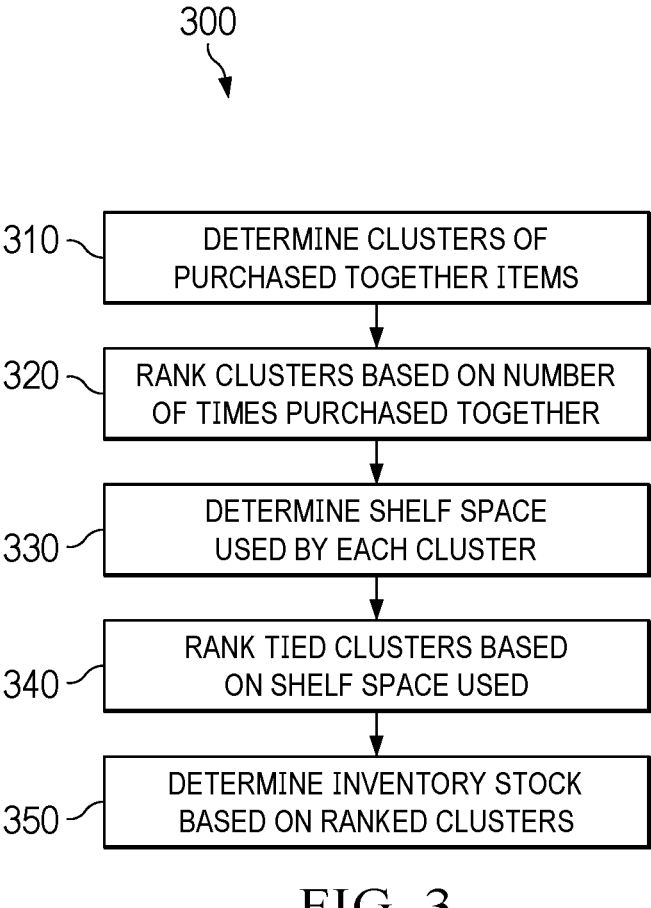
FIG. 3 illustrates an example method for determining what inventory to stock at a supply chain site based on item clusters, in accordance with an embodiment.

FIG. 3 illustrates example method 300 for determining what inventory to stock at a supply chain site based on item clusters, according to an embodiment. In embodiments, the supply chain site may be a micro fulfillment center or another supply chain entity that stocks products with a limited total inventory space. Method 300 may be performed by a smart MFC system, such as smart MFC system 110 of FIG. 1. Method 300 proceeds by one or more activities, which although described in a particular order may be performed in one or more permutations, combinations, orders, or repetitions, according to particular needs. In embodiments, smart MFC system 110 may utilize various data streams in order to identify and recommend clusters of items to stock at an inventory storage location in supply chain network 100 for a given time and/or duration of time.

At first activity 310 smart MFC system 110 determines a set of inventory clusters identifying inventory items that have been purchased together at the MFC. As discussed above, smart MFC system 110 may identify the inventory systems by accessing order histories associated with the MFC to determine what items have been purchased in combination at the MFC in the past over a particular time period. As an example only and not by way of limitation, smart MFC system 110 may determine the set of inventory clusters for the MFC for Friday evenings, though smart MFC system 110 may determine the set of inventory clusters for any other time period, such as weekly, monthly, seasonal or any other time span. In embodiments, smart MFC system 110 may use an order history, including which items have been purchased together, a quantity of items purchased, repeat orders and other details that may be stored in order history data, to identify clusters of items.

At second activity 320 smart MFC system 110 ranks the set of inventory clusters based on a number of times each cluster of inventory items was purchased together. The set of inventory clusters may be ranked by the number of times purchased together as an initial ranking which may be later refined by further ranking of tied clusters. In other embodiments, the initial ranking of the inventory clusters may be based on metrics other than the number of times purchased together, such as current trends associated with items of the clusters or other smart attributes.

At third activity 330 smart MFC system 110 determines an amount of shelf space needed for each of the set of inventory clusters. As discussed in further detail above, smart MFC system 110 may access catalogue data associated with the items of the set of inventory clusters to determine how much shelf space is required to stock each item and subsequently sum the individual item shelf space to determine an estimated shelf space for each inventory cluster.

At fourth activity 340 smart MFC system 110 ranks any inventory clusters that were purchased an equal number of times and thus tied according to the first ranking, based on the amount of shelf space needed to stock the clusters. Smart MFC system 110, by ranking the inventory clusters twice, may be able to incorporate multiple business objectives into the cluster ranking. In the embodiment of FIG. 3, smart MFC system 110 generates a ranking of the clusters incorporating two business priorities, first, stocking items that are commonly sold together, but also prioritizing clusters that occupy less shelf space, which may be particularly important in the context of a site with limited shelf space, such as an MFC.

At fifth activity 350 smart MFC system 110 determines inventory to stock at the supply chain site based on the cluster ranking. For example, smart MFC system 110 may determine to stock the items associated with a top percentage of clusters or a top absolute number of clusters based on a threshold set by a user of smart MFC system 110. In other embodiments, smart MFC system 110 may determine to stock as many of the items of the inventory clusters as possible, based on a projected capacity to store inventory at the supply chain site at a future time period. In embodiments, smart MFC system 110 may prompt a user of smart MFC system 110, such as via user interface module 218 of FIG. 2, if the user would like to generate and/or implement an inventory plan based on the cluster ranking. If the user confirms the request, smart MFC system 110 may automatically generate and implement an inventory plan based on the cluster ranking using one or more pieces of automated machinery. In further embodiments, smart MFC system 110 may be configured to automatically generate and implement inventory plans without prompting a user in certain circumstances.

In order to determine what clusters to recommend to a user of smart MFC system 110, smart MFC system 110 may consider data streams including storage location data, such as shelf space, storage location constraints, such as refrigeration, transport data, such as weather impacting transport, transport vehicles and transport schedules, delivery constraints data, such as delivery resources and shifts of delivery workers, catalogue data, such as the size, volume and weight of items and events data, such as festivals, weather or sports events that may impact sales at the supply chain site.

Figure 4:
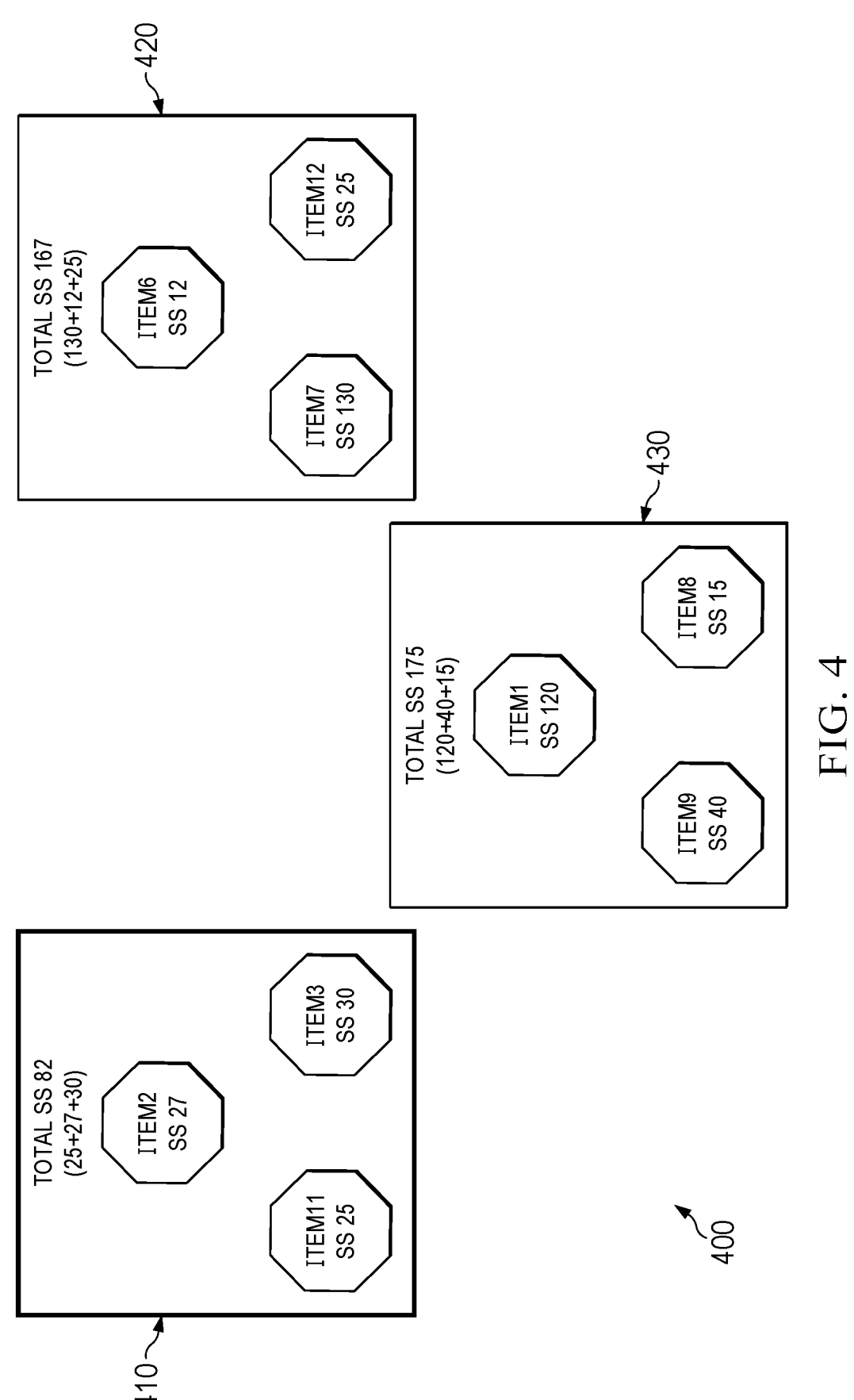
FIG. 4 illustrates a cluster diagram used to illustrate the ranking of clusters of purchased together items for a particular supply chain site, in accordance with an embodiment.

FIG. 4 illustrates cluster diagram 400 used to illustrate the ranking of clusters of purchased together items for a particular supply chain site, in this example a retailer of supply chain network 100, according to an embodiment. In cluster diagram 400, several clusters are ranked based on shelf space usage. In cluster diagram 400, three clusters have been identified: cluster 410 including Item2, Item11 and Item3, cluster 420 including Item6, Item7 and Item12 and cluster 430 including Item1, Item9 and Item8. In this example, all three of clusters 410, 420 and 430 have been purchased together an equal number of times and that after an initial ranking of the clusters based on purchase frequency, three clusters 410, 420 and 430 have a tied ranking.

Within cluster 410, Item2 has a shelf space usage of 27 cubic cm, shown as SS 27 in cluster diagram 400, Item11 has a shelf space usage of 25 cubic cm and Item3 has a shelf space usage of 30 cubic cm, for a total of 82 cubic centimeters being needed to stock cluster 410. Within cluster 420, Item6 has a shelf space usage of 12 cubic cm, Item7 has a shelf space usage of 130 cubic cm and Item12 has a shelf space usage of 25 cubic cm, for a total of 167 cubic centimeters being needed to stock cluster 420. Within cluster 430, Item1 has a shelf space usage of 120 cubic cm, Item9 has a shelf space usage of 40 cubic cm and Item8 has a shelf space usage of 15 cubic cm, for a total of 175 cubic centimeters being needed to stock cluster 430.

In this embodiment, a smart MFC system operated by or for the supply chain site, such as smart MFC system 110 of FIG. 1, will rank cluster 410 higher than cluster 420 and cluster 420 higher than cluster 430, because cluster 410 requires the least shelf space to stock while cluster 430 requires the most shelf space to stock. Thus, smart MFC system 110 may generate an inventory plan for the supply chain site including the item2, Item 11 and Item3 of cluster 410 but not including the item groups of clusters 420 and 430. In embodiments, if there is a certain projected inventory capacity, smart MFC system 110 may only recommend clusters including clusters that fit into the projected inventory capacity. For example, if there is a total of 300 cubic centimeters of shelf space available, smart MFC system 110 may recommend the items of cluster 410 and cluster 420 because the combined space for both clusters is under 300 cubic centimeters, while including the items of cluster 430 would exceed the limit of 300 cubic centimeters.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system for determining inventory to stock at a supply chain site, comprising:
    a computer, comprising a processor and a memory, the computer configured to:
        determine a set of inventory clusters identifying inventory items that have been purchased together;
        rank the set of inventory clusters based on a number of times each cluster of inventory items was purchased together;
        determine an amount of shelf space needed for each of the set of inventory clusters;
        rank any inventory clusters that were purchased an equal number of times based on the amount of shelf space needed to generate a cluster ranking;
        determine inventory to stock at the supply chain site based on the inventory cluster ranking; and
        produce products, by automated robotic production machinery, based, at least in part, on the determined inventory.

2. The system of claim 1, wherein the computer is further configured to:
    generate an inventory stocking plan based on the determined inventory to stock; and implement the inventory stocking plan at the supply chain site based on the inventory stocking plan using one or more pieces of automated stocking machinery.

3. The system of claim 1, wherein the computer is further configured to:
    refine the cluster ranking according to one or more smart attributes, the one or more smart attributes being selected from:
        trends in target customers for the supply chain site;
        events influencing demand for the inventory items;
        a search history of the inventory items; and
        sentiment analysis of publicly-available messages associated with the inventory items.

4. The system of claim 3, wherein the computer is further configured to:
    perform the sentiment analysis using a natural language processing model, the natural language processing model being selected from:
        a support vector machine, a term frequency model, a term frequency inverse document frequency model, a bag-of-words model, a logistic regression model, a Naïve Bayes model, a decision tree, a hidden Markov model, a convolutional neural network, a recurrent neural network, an auto-encoder model or a natural language processing transformer.

5. The system of claim 2, wherein the determined inventory of the inventory stocking plan comprises one or more items within top ranked clusters, one or more items from a top percentage of ranked clusters, or a percentage threshold of the top ranked clusters.

6. The system of claim 2, wherein the computer is further configured to:
    prioritize or deprioritize one or more items for the inventory stocking plan based on: one or more transportation constraints of the one or more items, one or more storage constraints of the supply chain site, one or more price constraints of the one or more items, or one or more other constraints of the one or more items or the supply chain site.

7. The system of claim 1, wherein the inventory clusters comprise one or more combinations of items that have previously been purchased together.

8. A computer-implemented method for determining inventory to stock at a supply chain site, comprising:
    determining, by a computer comprising a processor and a memory, a set of inventory clusters identifying inventory items that have been purchased together;
    ranking, by the computer, the set of inventory clusters based on a number of times each cluster of inventory items was purchased together;
    determining, by the computer, an amount of shelf space needed for each of the set of inventory clusters;
    ranking, by the computer, any inventory clusters that were purchased an equal number of times based on the amount of shelf space needed to generate a cluster ranking;
    determining, by the computer, inventory to stock at the supply chain site based on the inventory cluster ranking; and
    producing products, by automated robotic production machinery, based, at least in part, on the determined inventory.

9. The computer-implemented method of claim 8, further comprising:
    generating, by the computer, an inventory stocking plan based on the determined inventory to stock; and implementing, by the computer, the inventory stocking plan at the supply chain site based on the inventory stocking plan using one or more pieces of automated stocking machinery.

10. The computer-implemented method of claim 8, further comprising:

refining, by the computer, the cluster ranking according to one or more smart attributes, the one or more smart attributes being selected from:

trends in target customers for the supply chain site;

events influencing demand for the inventory items;

a search history of the inventory items; and sentiment analysis of publicly-available messages associated with the inventory items.

11. The computer-implemented method of claim 10, further comprising:

performing, by the computer, the sentiment analysis using a natural language processing model, the natural language processing model being selected from:

a support vector machine, a term frequency model, a term frequency inverse document frequency model, a bag-of-words model, a logistic regression model, a Naïve Bayes model, a decision tree, a hidden Markov model, a convolutional neural network, a recurrent neural network, an auto-encoder model or a natural language processing transformer.

12. The computer-implemented method of claim 9, wherein the determined inventory of the inventory stocking plan comprises one or more items within top ranked clusters, one or more items from a top percentage of ranked clusters, or a percentage threshold of the top ranked clusters.

13. The computer-implemented method of claim 9, further comprising:

prioritizing or deprioritizing, by the computer, one or more items for the inventory stocking plan based on: one or more transportation constraints of the one or more items, one or more storage constraints of the supply chain site, one or more price constraints of the one or more items, or one or more other constraints of the one or more items or the supply chain site.

14. The computer-implemented method of claim 8, wherein the inventory clusters comprise one or more combinations of items that have previously been purchased together.

15. A non-transitory computer-readable medium embodied with software for determining inventory to stock at a supply chain site, the software when executed is configured to:

determine, by a computer comprising a processor and a memory, a set of inventory clusters identifying inventory items that have been purchased together;

rank the set of inventory clusters based on a number of times each cluster of inventory items was purchased together;

determine an amount of shelf space needed for each of the set of inventory clusters;

rank any inventory clusters that were purchased an equal number of times based on the amount of shelf space needed to generate a cluster ranking;

determine inventory to stock at the supply chain site based on the inventory cluster ranking; and produce products, by automated robotic production machinery, based, at least in part, on the determined inventory.

16. The non-transitory computer-readable medium of claim 15, wherein the software when executed is further configured to:

generate an inventory stocking plan based on the determined inventory to stock; and implement the inventory stocking plan at the supply chain site based on the inventory stocking plan using one or more pieces of automated stocking machinery.

17. The non-transitory computer-readable medium of claim 15, wherein the software when executed is further configured to:

refine the cluster ranking according to one or more smart attributes, the one or more smart attributes being selected from:

trends in target customers for the supply chain site;

events influencing demand for the inventory items;

a search history of the inventory items; and sentiment analysis of publicly-available messages associated with the inventory items.

18. The non-transitory computer-readable medium of claim 17, wherein the software when executed is further configured to:

perform the sentiment analysis using a natural language processing model, the natural language processing model being selected from:

a support vector machine, a term frequency model, a term frequency inverse document frequency model, a bag-of-words model, a logistic regression model, a Naïve Bayes model, a decision tree, a hidden Markov model, a convolutional neural network, a recurrent neural network, an auto-encoder model or a natural language processing transformer.

19. The non-transitory computer-readable medium of claim 16, wherein the determined inventory of the inventory stocking plan comprises one or more items within top ranked clusters, one or more items from a top percentage of ranked clusters, or a percentage threshold of the top ranked clusters.

20. The non-transitory computer-readable medium of claim 16, wherein the software when executed is further configured to:

prioritize or deprioritize one or more items for the inventory stocking plan based on: one or more transportation constraints of the one or more items, one or more storage constraints of the supply chain site, one or more price constraints of the one or more items, or one or more other constraints of the one or more items or the supply chain site.

\* \* \* \* \*